United States Patent [11] 3,539,246

[72] Inventor Tomokazu Kazamaki
 Tokyo-to, Japan
[21] Appl. No. 648,909
[22] Filed June 26, 1967
[45] Patented Nov. 10, 1970
[73] Assignee Asahi Kogaku Kogyo Kabushiki Kaisha
 Tokyo-to, Japan
 a corporation of Japan
[32] Priority June 30, 1966
[33] Japan
[31] 41/42,823

[54] RETROFOCUS LENS SYSTEM
 2 Claims, 2 Drawing Figs.
[52] U.S. Cl. .................................................... 350/215,
 350/207, 350/234
[51] Int. Cl. ...................................................... G02b 9/00,
 G02b 9/62, G02b 11/34
[50] Field of Search .......................................... 350/207,
 183, 215, 234

[56] References Cited
 UNITED STATES PATENTS
2,644,943 7/1953 Klein ............................ 350/215(X)UX FOREIGN PATENTS
978,797 12/1964 Great Britain ................ 350/215

Primary Examiner—David Schonberg
Assistant Examiner—Paul A. Sacher
Attorney—Stanley Wolder ABSTRACT: A compact retrofocus wide angle lens system comprises twelve lenses, the first three lenses being positive, negative and negative respectively, the next three lenses being cemented as a unit and being successively negative, positive and negative, the next three lenses being cemented as a unit and being successively positive, negative and positive and the last three lenses being cemented as a unit and being successively positive, negative and positive. The front face of the fourth lens is flat or concave, the Abbe number of the fourth lens is greater than that of the fifth lens, the refractive index of the fifth lens is greater than that of the sixth lens, the index of refraction of the eighth lens is greater than that of the seventh lens and of the ninth lens and the refractive index of the eleventh lens is greater than that of the tenth lens and that of the twelfth lens.

(a) SPHERICAL ABERRATION SINE CONDITION (S.C)
— d-line
--- S.C (b) DISTORTION (c) ASTIGMATISM
— ΔS
--- ΔM

RETROFOCUS LENS SYSTEM

BACKGROUND OF THE INVENTION

The present invention relates generally to improvements in lens systems and it relates particularly to an improved retrofocus wide angle lens system.

In retrofocus lens systems of conventional design, the diameter of the front or first lens increases as the length of the back focus increases and the angle of the field becomes greater. Particularly in a lens system having a wide angle of field, such as the Flektogon f = 20 mm. 1:4, the diameter of the front lens is about 55 mm. and the overall length of the lens system is very large. As a consequence, conventional lens systems of this type are heavy and bulky so that cameras provided with these lens systems are difficult and awkward to handle and a satisfactory steady hand support and manipulation thereof is almost impossible. Moreover, a carrying case for a camera provided with the conventional wide angle retrofocus lens system, in order to accommodate the lens system is correspondingly awkward and bulky and expensive.

SUMMARY OF THE INVENTION

It is a principal object of the present invention to provide an improved wide angle lens system.

Another object of the present invention is to provide an improved retrofocus wide angle lens system.

Still another object of the present invention is to provide an improved highly compact retrofocus wide angle lens system.

A further object of the present invention is to provide an improved compact retrofocus wide angle lens system of high optical quality.

The above and further objects of the present invention will become apparent from a reading of the following description taken in conjunction with the accompanying drawing which illustrates a preferred embodiment thereof.

In a sense, the present invention contemplates the provision of a retrofocus lens system comprising twelve lenses consecutively designated as the first to the twelfth and satisfying the following conditions:

$$r_7 = \infty \text{ or } r_7 < 0$$
$$\nu_4 > \nu_5$$
$$n_5 > n_6$$
$$n_8 > n_7$$
$$n_8 > n_9$$
$$n_{11} > n_{10}$$
$$n_{11} > n_{12}$$

wherein $r_7$ is the radius of curvature of the front face of the fourth lens, $\nu_j$ is the Abbe value of the subscript designated lens, and $n_n$ is the index of refraction of the subscript designated lens.

The first lens is positive, and each of the second and the third lenses is of the negative meni-type with the surface of larger curvature directed to the image side. The fourth, the fifth and the sixth lenses are cemented together and resultant lens group is so placed as to be as close to the third lens as possible. The fourth lens is negative, the fifth lens is positive and the sixth lens is of the negative meniscus type with the surface of the larger curvature directed to the object side. The seventh lens is positive, the eighth lens is negative and the ninth lens is positive, these three lenses being cemented together. The tenth lens is positive, the eleventh lens is negative and the twelfth lens is positive, these three lenses being also cemented together. A diaphragm is positioned between the ninth and the tenth lenses.

The resultant power of the first, the second and the third lenses, designated as $F_{123}$, is of negative value, and in order to lengthen the back focus of a retrofocus lens system, it is generally necessary to increase the absolute value of $f_{123}$. In lens system designing practice, however, any excessive increase in the negative power of $f_{123}$ must be avoided since it would result in an excessive overcorrection of Petzval sum. The generally practiced method is to utilize a certain smaller value of $f_{123}$ and to provide a larger spacing from the next positive lens, thus lengthening the back focus. With such method, however, it is unavoidable that the first lens becomes excessively large as the angle of field increases.

In accordance with the present invention, an optical element is placed at the region corresponding to said air spacing so as to prevent the first lens from becoming larger. This optical element corresponds to the thick cemented-lens element consisting of the fourth, the fifth and the sixth lenses. An important and unique feature of the present lens system is that the radius of curvature $r_7$ of the front face of the fourth lens is of negative value or infinite, $r_7 < 0$, that is, the fourth lens front face is flat or concave.

With the condition $\nu_4 > \nu_5$, if a greater Abbe number $\nu_1$ of the first lens is not employed, the chromatic difference of magnification aggravates so that the cementation is adopted to eliminate color as early as possible. The condition $n_5 > n_6$ provides a suitable correction of coma aberration in the wide angle of the field of the present lens system. The conditions $n_8 > n_7$, $> n_9$, $n_{11} > n_{10}$, and $n_{11} > n_{12}$ prevent the overcorrection of the Petzval sum.

DESCRIPTION OF PREFERRED EMBODIMENT

Figure 1:
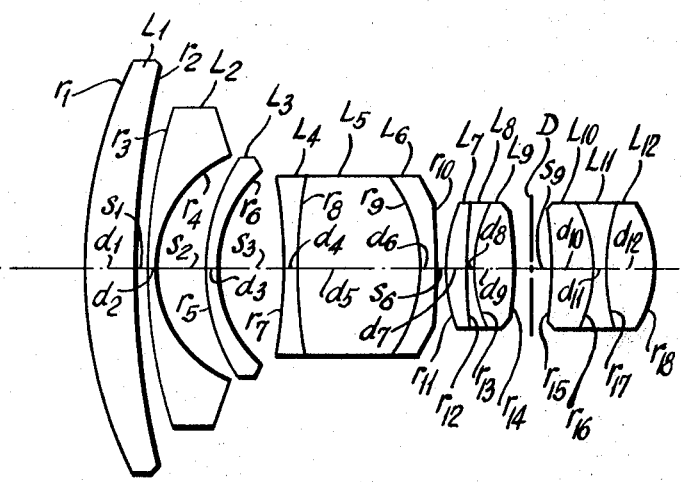
FIG. 1 is a schematic representation of a preferred embodiment of the invention.

Referring now to the drawing and particularly FIG. 1 thereof which illustrates a preferred embodiment of the present invention, the improved lens system comprises twelve coaxially positioned lenses designated successively as lenses L1 to L12 respectively. The fourth, fifth and sixth lenses L4, L5 and L6 are cemented together with their confronting faces in mating registry to form a unit, the seventh, eighth and ninth lenses L7, L8 and L9 are cemented together with their confronting faces in mating registry to form a unit, and the tenth, eleventh and twelfth lenses L10, L11 and L12 are cemented together with their confronting faces in mating registry to form a unit.

The first lens, L1 is a positive lens with an index of refraction $n_1$ and a thickness $d_1$, a front face of radius of curvature $r_1$ and a rear face of radius of curvature $r_2$; the second lens L2 is a meniscus type negative lens spaced from the lens L1 a distance $s_1$ and having a thickness $d_2$, a refractive index $n_2$, a convex front face of radius of curvature $r_3$ and a concave rear face of radius of curvature $r_4$; and the third lens L3 is a meniscus type negative lens spaced from the lens L2 a distance $s_2$ and having a thickness $d_3$, a refractive index $n_3$, a convex front face of radius of curvature $r_5$ and a concave rear face of radius of curvature $r_6$.

The fourth, fifth and sixth lenses, L4, L5 and L6, are a cemented triplet unit, the lens L4 being negative and spaced from the lens L3 a distance $s_3$ and having a thickness $d_4$, a refractive index $n_4$, a front face of radius of curvature $r_7$ and a rear face of radius of curvature $r_8$; the fifth lens L5 being a positive lens of thickness $d_5$ with a front face of radius of curvature $r_8$ and a rear face of radius of curvature $r_9$; the sixth lens L6 being a negative meniscus type lens with its rear face convex and having a thickness $d_6$, a refractive index $n_6$, a front face of radius of curvature $r_9$ and a rear face of radius of curvature $r_{10}$.

The seventh, eighth and ninth lenses, L7, L8 and L9, are cemented together as a triplet unit, the seventh lens L7 being positive and spaced from the lens L6 a distance $s_6$ and having a thickness $d_7$, an index of refraction $n_7$, a front face of radius of curvature $r_{11}$ and a rear face of radius of curvature $r_{12}$; the eighth lens L8 being negative and having a thickness $d_8$, an index of refraction $n_8$, a front face of radius of curvature $r_{12}$ and a rear face of radius of curvature $r_{13}$; and the ninth lens L9 being positive and having a thickness $d_9$, an index refraction $n_9$ a front face of radius of curvature $r_{13}$ and a rear face of radius of curvature $r_{14}$.

The tenth, eleventh and twelfth lenses, L10, L11 and L12, are cemented together as a triplet unit, the tenth lens L10 being positive and spaced from the lens L9 a distance $s_9$ and having a thickness $d_{10}$, an index of refraction $n_{10}$, a front face of radius of curvature $r_{15}$ and a rear face of radius of curvature $r_{16}$; the eleventh lens L11 being negative and having a thickness $d_{11}$, a refractive index $n_{17}$, a front face of radius of curvature $r_{16}$ and a rear face of radius of curvature $r_{17}$; and the twelfth lens L12 being positive and having a thickness $d_{12}$, refractive index $n_{12}$, a front face of radius of curvature $r_{17}$ and a rear face of radius of curvature $r_{18}$.

A centrally apertured diaphragm D is coaxially positioned between the ninth and tenth lenses L9 and L10 respectively. It should be noted that the lens spacings are measured axially between the confronting faces of the correspondingly spaced lenses. The dimensions, relationships and parameters of the lenses are such as to satisfy the conditions previously set forth.

The following Table I recites the dimensions and parameters of a specific example of the present lens system having a focal length of F = 100 mm.

TABLE I.—LENS DATA

| | | |
|---|---|---|
| $r_1=140.000$ | $d_1=18.00$ | $n_1=1.61720/54.0$ |
| $r_2=406.149$ | $S_1=0.50$ | |
| $r_3=180.000$ | $d_2=3.50$ | $n_2=1.64000/60.2$ |
| $r_4=41.772$ | $S_2=15.50$ | |
| $r_5=88.000$ | $d_3=3.50$ | $n_3=1.64000/60.2$ |
| $r_6=41.814$ | $S_3=18.00$ | |
| $r_7=-230.000$ | $d_4=3.50$ | $n_4=1.62041/60.3$ |
| $r_8=70.000$ | $d_5=42.00$ | $n_5=1.66446/35.9$ |
| $r_9=-45.000$ | $d_6=5.00$ | $n_6=1.63980/34.6$ |
| $r_{10}=-193.474$ | $S_6=0.50$ | |
| $r_{11}=60.500$ | $d_7=7.50$ | $n_7=1.59270/35.4$ |
| $r_{12}=180.000$ | $d_8=3.00$ | $n_8=1.74077/27.7$ |
| $r_{13}=44.000$ | $d_9=12.50$ | $n_9=1.51118/50.9$ |
| $r_{14}=-119.362$ | $S_9=14.00$ | |
| $r_{15}=-195.000$ | $d_{10}=13.00$ | $n_{10}=1.60729/49.3$ |
| $r_{16}=-43.500$ | $d_{11}=3.00$ | $n_{11}=1.72342/38.0$ |
| $r_{17}=42.000$ | $d_{12}=15.50$ | $n_{12}=1.58921/41.0$ |
| $r_{18}=-58.393$ | | |

Table II sets forth the Seidel coefficients of the specific lens system when F = 1 mm. and the diaphragm D is positioned between the ninth and tenth lenses.

TABLE II.—SEIDEL COEFFICIENTS

| | $S_1$ | $S_2$ | $S_3$ | P | $S_5$ |
|---|---|---|---|---|---|
| 1 | 0.086 | 0.066 | 0.051 | 0.272 | 0.252 |
| 2 | 0.000 | -0.008 | 0.142 | -0.093 | -0.845 |
| 3 | -0.003 | -0.012 | -0.050 | 0.216 | 0.674 |
| 4 | -8.961 | 1.119 | -0.139 | -0.934 | 0.134 |
| 5 | 3.360 | 0.506 | 0.076 | 0.443 | 0.078 |
| 6 | -30.546 | 2.321 | -0.176 | -0.933 | 0.084 |
| 7 | 1.353 | 0.700 | 0.362 | -0.166 | 0.101 |
| 8 | 2.795 | -0.081 | 0.002 | 0.023 | -0.000 |
| 9 | 0.838 | -0.146 | 0.025 | 0.020 | -0.007 |
| 10 | -0.031 | -0.088 | -0.248 | 0.201 | -0.131 |
| 11 | 55.718 | 3.148 | 0.177 | 0.615 | 0.044 |
| 12 | 0.009 | 0.004 | 0.002 | 0.029 | 0.015 |
| 13 | -28.372 | -1.043 | -0.038 | -0.198 | -0.008 |
| 14 | 7.720 | -1.902 | 0.468 | 0.283 | -0.185 |
| 15 | -3.177 | 1.004 | -0.317 | -0.193 | 1.161 |
| 16 | -14.023 | 0.508 | -0.018 | -0.096 | 0.004 |
| 17 | -26.794 | -3.285 | -0.402 | -0.116 | -0.063 |
| 18 | 46.339 | -2.084 | 0.093 | 0.634 | -0.032 |
| Sum | 6.312 | 0.727 | 0.010 | 0.007 | 0.274 |

In table I, $r_n$ are the radii of curvature of the subscript designated lens faces and $d_n$ the lens spacings and lens thicknesses as identified above, the numerators of $n_n$ are the indices of refraction of the corresponding subscript designated lenses and the denominators are the respective Abbe numbers thereof.

Figure 2:
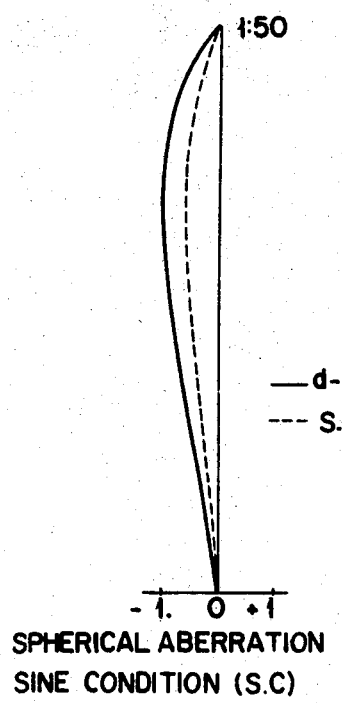
FIG. 2 illustrates the aberration curves of the preferred embodiment.
Figure 2:
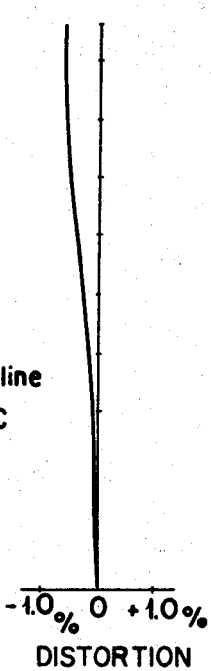
Figure 2:
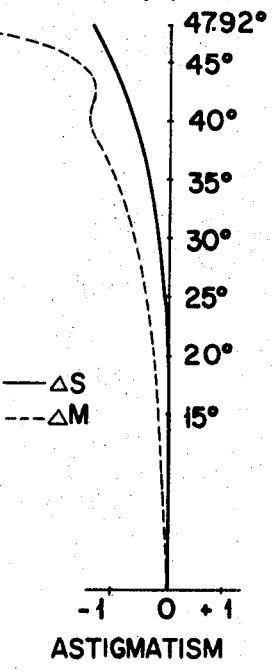

As seen in FIG. 2 of the drawings, which illustrate the aberration curves of the specific lens system with F = 100 mm., although the angle of field is wide, the Petzval sum and astigmatisms are small and with a half-angle of field of 47.92°, the diameter of the first lens is less than 1.4 F which in lens systems of the subject type, is extremely small.

While there has been described and illustrated a preferred embodiment of the present invention, it is apparent that numerous alterations may be made without departing from the spirit thereof.

I claim:

1. A retrofocus lens system comprising twelve lenses consecutively designated as the first to the twelfth lens, the fourth, fifth and sixth lenses constituting a cemented triplet, the seventh, eighth and ninth lenses constituting a cemented triplet and the tenth, eleventh and twelfth lenses constituting a cemented triplet, the lens faces being consecutively designated as the first to eighteenth with each pair of confronting mating surfaces of said triplets defining a single lens face, said lenses having the following dimensions and parameters:

| | | |
|---|---|---|
| $r_1=140.000$ | $d_1=18.00$ | $n_1=1.61720/54.0$ |
| $r_2=406.149$ | $S_1=0.50$ | |
| $r_3=180.000$ | $d_2=3.50$ | $n_2=1.64000/60.2$ |
| $r_4=41.772$ | $S_2=15.50$ | |
| $r_5=88.000$ | $d_3=3.50$ | $n_3=1.64000/60.2$ |
| $r_6=41.814$ | $S_3=18.00$ | |
| $r_7=-230.000$ | $d_4=3.50$ | $n_4=1.62041/60.3$ |
| $r_8=70.000$ | $d_5=42.00$ | $n_5=1.66446/35.9$ |
| $r_9=-45.000$ | $d_6=5.00$ | $n_6=1.63980/34.6$ |
| $r_{10}=-193.474$ | $S_6=0.50$ | |
| $r_{11}=60.500$ | $d_7=7.50$ | $n_7=1.59270/35.4$ |
| $r_{12}=180.000$ | $d_8=3.00$ | $n_8=1.74077/27.7$ |
| $r_{13}=44.000$ | $d_9=12.50$ | $n_9=1.51118/50.9$ |
| $r_{14}=-119.362$ | $S_9=14.00$ | |
| $r_{15}=-195.000$ | $d_{10}=13.00$ | $n_{10}=1.60729/49.3$ |
| $r_{16}=-43.500$ | $d_{11}=3.00$ | $n_{11}=1.72342/38.0$ |
| $r_{17}=42.000$ | $d_{12}=15.50$ | $n_{12}=1.58921/41.0$ |
| $r_{18}=-58.393$ | | | wherein $r_i$ is the radius of curvature of the i-th lens face, $d_n$ is the thickness of the n-th lens, $s_n$ is the axial spacing being the n-th lens and the next successive lens, $n_n$ is the index of refraction and Abbe value of the n-th lens.

2. A retrofocus lens system comprising twelve lenses designated as the first to the twelfth lens, said first lens being positive and said second and third lenses being negative meniscus lenses with their rear faces being concave, said fourth, fifth and sixth lenses being a cemented triplet unit, the fourth lens being negative, the fifth lens being positive and the sixth lens being a negative meniscus lens with its rear face convex, said seventh, eighth and ninth lenses being a cemented unit, the seventh lens being positive, the eighth lens being negative and the ninth lens being positive, and said tenth, eleventh and twelfth lenses being a cemented unit, said tenth lens being positive, said eleventh lens being negative and said twelfth lens being positive, the curvature of the front face of the fourth lens being nonconvex, the Abbe value of the fourth lens being greater than that of the fifth lens, the index of refraction of the fifth lens being greater than that of the sixth lens, the index of refraction of the eighth lens being greater than those of the seventh and ninth lenses and the index of refraction of the eleventh lens being greater than those of the tenth and twelfth lenses.